US005236079A

United States Patent [19]

Herold

[11] Patent Number: 5,236,079

[45] Date of Patent: Aug. 17, 1993

[54] BELT FASTENER ARRANGEMENT

[75] Inventor: Wolfgang Herold, Offenbach am Main, Fed. Rep. of Germany

[73] Assignee: MATO Maschinen-und Metallwarenfabrik Curt Matthaei GmbH & Co KG

[21] Appl. No.: 893,381

[22] Filed: Jun. 4, 1992

Related U.S. Application Data

[63] Continuation-in-part of Ser. No. 778,702, Oct. 18, 1991.

[30] Foreign Application Priority Data

Jun. 5, 1991 [DE] Fed. Rep. of Germany ....... 4118364

[51] Int. Cl.$^5$ ............ B65G 15/30

[52] U.S. Cl. ............ 198/844.2; 474/257; 24/31 B

[58] Field of Search ............ 198/844.2; 474/257; 24/31 B, 38

[56] References Cited

U.S. PATENT DOCUMENTS

| | | | |
|---|---|---|---|
| 1,605,950 | 11/1926 | Hohl | 24/31 B |
| 4,653,156 | 3/1987 | Stolz et al. | 24/31 B |
| 5,038,442 | 8/1991 | Stolz et al. | 24/33 |
| 5,097,944 | 3/1992 | Schick | 198/844.2 |

FOREIGN PATENT DOCUMENTS

| | | | |
|---|---|---|---|
| 18827 | 5/1882 | Fed. Rep. of Germany . | |
| 36837 | 7/1886 | Fed. Rep. of Germany . | |
| 832366 | 8/1952 | Fed. Rep. of Germany . | |
| 3913943A1 | 5/1990 | Fed. Rep. of Germany . | |
| 956169 | 4/1964 | United Kingdom | 24/31 B |

OTHER PUBLICATIONS

"Bachstroem": Die Bergbau-Aulieferindustrie auf der Hannover-Messe 1968. Gluckauf, (2 pages), Jun. 20, 1968.

*Primary Examiner*—Joseph E. Valenza
*Attorney, Agent, or Firm*—Price, Heneveld, Cooper, DeWitt & Litton

[57] ABSTRACT

A fastener arrangement is provided for interconnecting the opposite ends of conveyor belts and the like, and includes a plurality of upper and lower plates arranged in a predetermined side-by-side relationship, and having interior faces shaped to abut both sides of the belt along the opposite belt ends. Each of the upper and lower plates includes apertures through opposite ends thereof in which associated fasteners are closely received. The fasteners have sharpened free ends which are driven through the opposite belt ends, and are bent closed into a crimped condition in which the upper and lower plates are converged and securely mounted on the opposite belt ends. Sealing strips extend along the upper and lower plates and retain the same in their predetermined side-by-side relationship, and are configured to bridge the gap between the opposite belt ends. When the free ends of the fasteners are crimped closed, the sealing strips are imbedded into both sides of the opposite belt ends, and thereby form a seal therebetween.

21 Claims, 2 Drawing Sheets

5
9
7
11
7
13
14
10
12
7
6

III
1
7
8
3
15
19
2
16
III
4

9
18
13
17
1
5
9
7
3
2
4
7
6
18
17
19
14

9
5
2
18
13a
17
1
9
7
3
4
6
18
19
14a
17
7

9
5
2
18
13b
17
1
9
7
3
4
7
6
18
19
14b
17

BELT FASTENER ARRANGEMENT

CROSS-REFERENCES TO RELATED APPLICATIONS

The present application is a continuation-in-part of commonly assigned, co-pending U.S. patent application Ser. No. 778,702, filed Oct. 18, 1991, entitled METHOD AND APPARATUS FOR FASTENING BELT ENDS, which is hereby incorporated by reference.

BACKGROUND OF THE INVENTION

The present invention relates to fastening systems for conveyor belts and the like, and in particular to a self-sealing fastener.

Endless belts are used in a wide variety of different applications, such as power drive belts, conveyor belts, and the like. Various fastener arrangements are available for interconnecting the opposite ends of such belts.

In these fastener arrangements, it is clearly advantageous to provide a system which securely and reliably interconnects the opposite belt ends to form a very durable connection or joint. It is also advantageous to form a seal between the opposite ends of the belt to prevent material from becoming entrapped therebetween.

SUMMARY OF THE INVENTION

On aspect of the present invention is to provide a self-sealing fastener arrangement for interconnecting the opposite ends of conveyor belts and the like. A plurality of upper and lower plates each arranged in a predetermined side-by-side relationship, and include interior faces shaped to abut both sides of the belt along the opposite ends thereof. Each of the upper and lower plates includes apertures through opposite ends thereof in which associated fasteners are closely received. The fasteners have sharpened free ends which are driven through the opposite belt ends, and are bent closed into a set or crimped condition in which the upper and lower plates are converged and securely mounted on the opposite belt ends. At least one sealing strip is provided to extend along either the upper or lower plates so as to retain the same in their predetermined side-by-side relationship, and to bridge the gap between the opposite belt ends, whereby when the free ends of the fasteners are crimped closed, the sealing strip is embedded into the associated side of the opposite belt ends and thereby forms a seal therebetween.

The principle objects of the present invention are to provide a very durable fastener which not only securely interconnects the opposite ends of a belt, but simultaneously forms a seal therebetween. The fastener arrangement has an uncomplicated design, and can be quickly and easily assembled on the belt. The fastener arrangement is also efficient in use, economical to manufacture, capable of a long operating life, and particularly well adapted for the proposed use.

These and other advantages of the invention will be further understood and appreciated by those skilled in the art by reference to the following written specification, claims, and appended drawings.

DETAILED DESCRIPTION OF THE PREFERRED EMBODIMENTS

Figure 3:
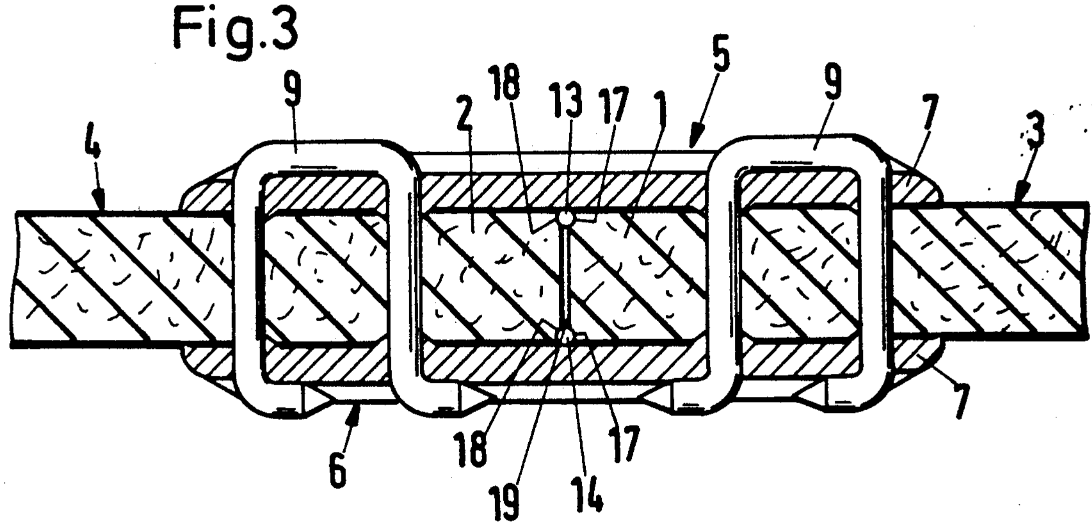
FIG. 3 is a longitudinal, cross-sectional view of the fastener, shown installed on opposite ends of a belt.
Figure 4:
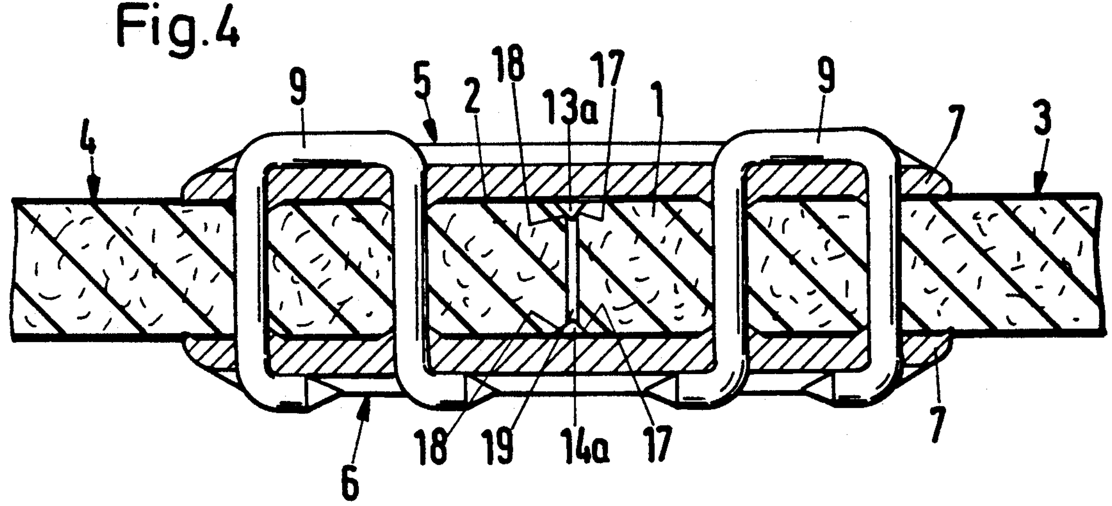
FIG. 4 is a longitudinal, cross-sectional view of another embodiment of the present fastener, shown installed on opposite ends of a belt.
Figure 5:
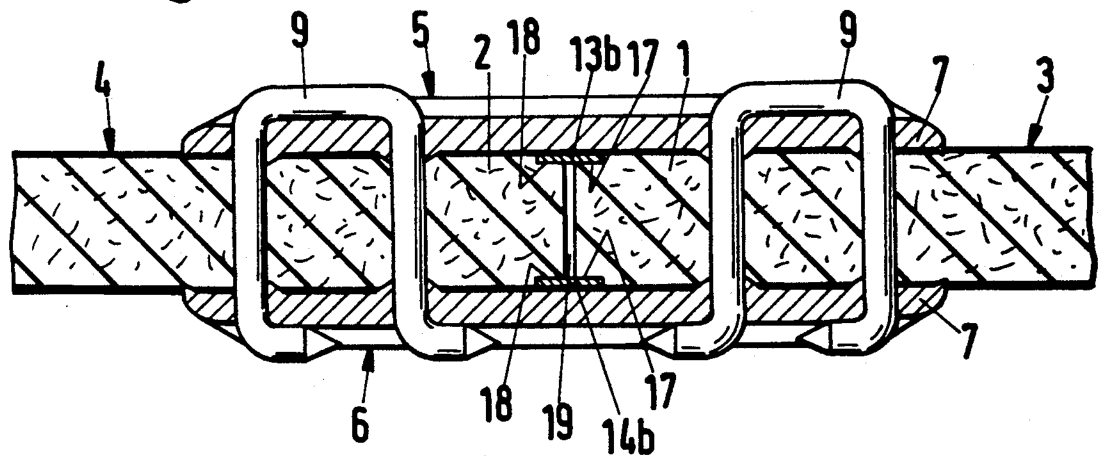
FIG. 5 is a longitudinal cross-sectional view of yet another embodiment of the present fastener, shown installed on opposite ends of a belt.

For purposes of description herein, the terms "upper", "lower", "right", "left", "rear", "front", "vertical", "horizontal" and derivatives thereof shall relate to the invention as oriented in FIGS. 3–5. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
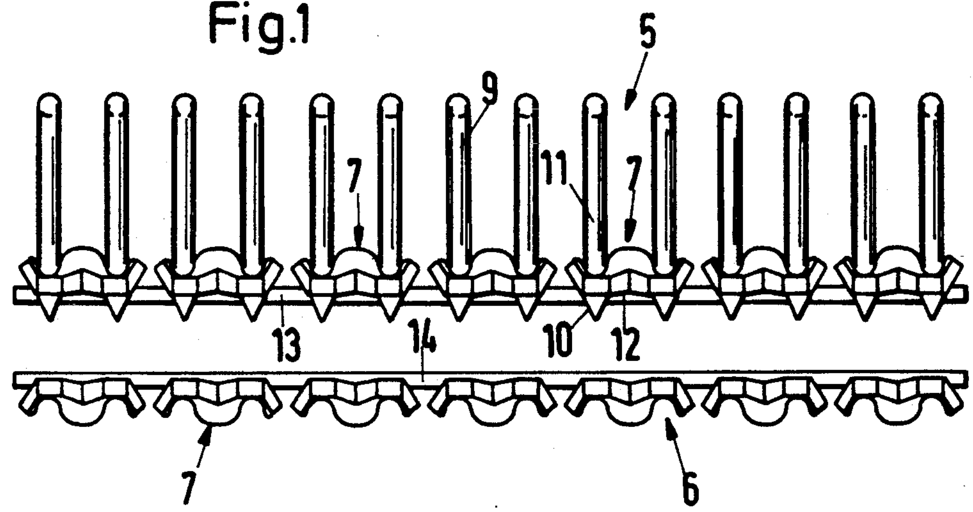
FIG. 1 is a front elevational view of a belt fastener embodying the present invention, having upper and lower fastener plates.

In the illustrated examples, the fastening arrangements provide a hingeless type of connection for the opposite ends 1 and 2 of conveyor belt segments 3 and 4, and can also be used to interconnect broken pieces or partial lengths of conveyor belt segments 3 and 4. Conveyor belt connector elements 5 and 6 consist of several elongated or strip-shaped individual plates 7, which have been provided with apertures 8 for staples 9. AS shown in FIG. 1, the staples 9 are inserted into the upper conveyor belt connector plates 5 in such a manner that the sharpened or pointed ends 10 of the staple legs 11 protrude slightly from the interior side or surface 12 of the individual plate 7.

Figure 2:
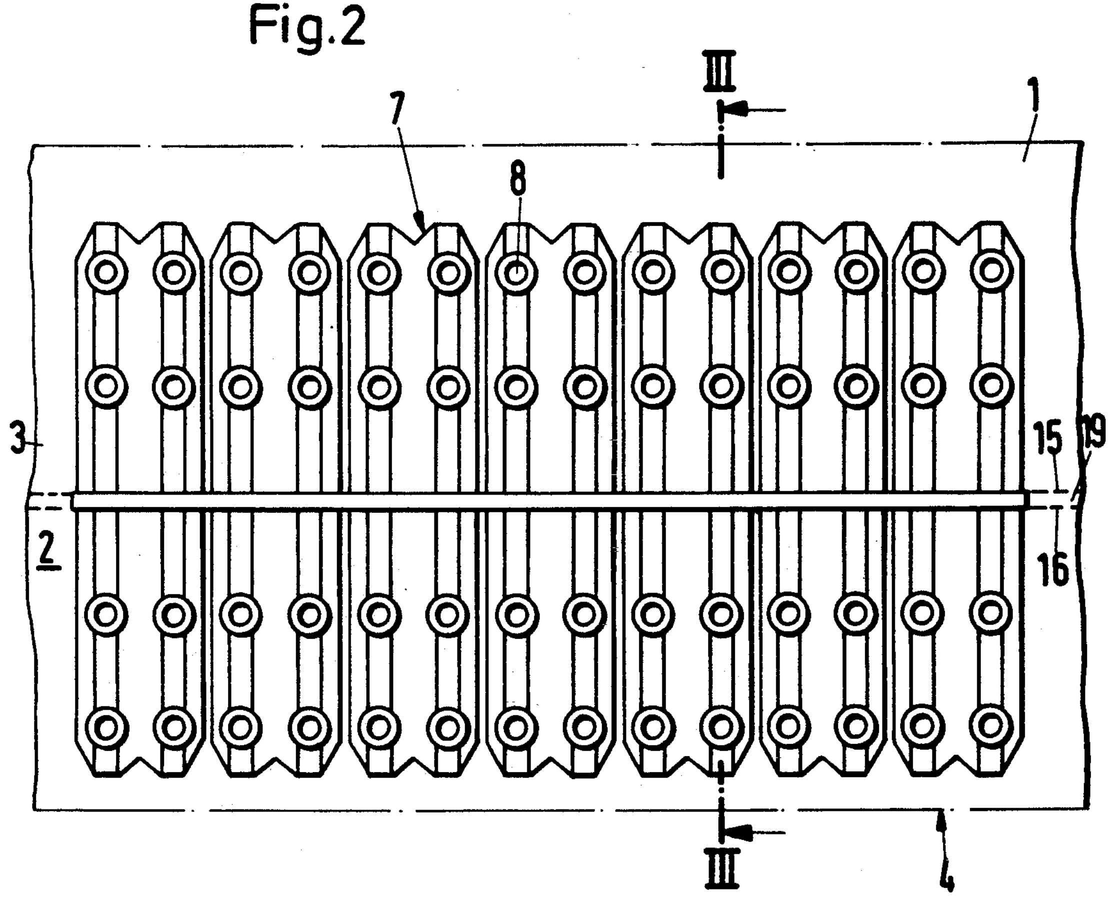
FIG. 2 is a top plan view of the lower fastener plates.

The upper conveyor belt connector plates 5, as well as the lower conveyor belt connector plates 6, have each been provided with a holding and sealing element 13 and 214 for cases when several individual plates 7, located on a the common plane, are to be connected. The holding and sealing elements 13 and 14 are arranged on the individual plates 7 in such a way that the ends 1 and 2 of conveyor belt segments 3 and 4 that are to be connected at their frontal areas 15 and 16, as well as along their outer edges 17 and 18 will rest against the holding and sealing elements 13 and 14. For this purpose, the holding and sealing elements 13 and 14 serve to connect the individual plates 7, and are arranged on the plates 7 both centrally, as well as crossing them, as shown in FIG. 2.

The holding and sealing elements 13 and 14 generally comprise strips, in the nature of rigid bars, that extend generally perpendicular to the longitudinal axes of the plates 7, along their transverse axes. In the example shown in FIG. 3, the sealing strips 13 and 14 consist of a wire, having a circular, transverse, cross-sectional shape. The circular cross-sectional shape is not mandatory however, since the sealing strips **13*a* and 13*b*** and 14*a* and 14*b* may also have a non-circular cross-sectional shape, such as the triangular sealing strip shown in FIG. 4, or the rectangular shape shown in FIg. 5. In the event sealing strips 13 and 13*a* or 14 and 14*a* are wires that are made of material which can be soldered or welded, they may be soldered or welded to the individual plates 7. In principle, however, it is also possible to connect the sealing strips 13–14*b* to the individual plates 7 by means of adhesives or the like. This type of adhesive connection is especially appropriate when the sealing strips thin and/or, narrow such as sealing strips 13*b* and 14*b*. The same as the sealing strips 13, 113*a*, 14 and 14*a*, which, as a rule, consists of a wire whose cross-sectional shape is either circular, triangular, or square. These sealing strips 13–14*b* cover or bridge the gap 19 that exists at the junction point between the two frontal areas 15 and 16 at the ends 1 and 2 of conveyor belt segments 3 and 4. Regardless of what size the internal ship of the gap 19 may be, the sealing strips 13–14*b* will effectively and reliably seal it off. The sealing process is effected by form-locking, as well as by force-locking, resulting in a highly efficient seal.

Furthermore, as shown in the various FIGS. 1–5, an efficient function of the sealing strips 13, 13*a* and 13*b* or 14, 14*a*, 14*b* are achieved when they are both on the interior surface of the upper and lower plates 7 that faces the conveyor belts 3 and 4 that are to be connected, as well as between the staples 9. The sealing strips are located at even intervals between the stapes 9, and either span the gap 19, or slightly penetrate in it.

As noted above, sealing strips 13–14*b* serve to interconnect and retain each group of upper and lower plates 7 in their predetermined side-by-side relationship. Sealing strips 13–14*b* are positioned to protrude inwardly from the interior faces of the upper and lower plates 7, and are configured to bridge the gap 19 between the opposite belt ends 15 and 16, whereby when the free ends 10 of the fasteners 9 are bent closed into a crimped condition (FIGS. 3–5), the associated sealing strips 13–14*b* are embedded into the associated sides of the belt along the opposite belt ends 15 and 16, and thereby form a seal therebetween. Although each of the illustrated examples show sealing strips 13–14*b* on both sides of the belt, it is also contemplated that fastener arrangement can include a single sealing strip 13–14*b* on only one side of the belt.

In operation, the opposite ends 15 and 16 of belt segments 2 and 3 are interconnected in the following fashion. The opposite ends 15 and 16 of belt segments 1 and 2 are positioned adjacent one another as illustrated in FIGS. 2–5, thereby forming a slight gap 19 therebetween. The upper and lower plates 7 are oriented along the opposite belt ends 15 and 16, so as to extend over, or bridge the gap 19. The opposite pairs of upper and lower plates 7 are positioned so that their fastener apertures 8 are vertically aligned. Staples 9 are preferably press fitted into the apertures 8 of one set of plates 7, such as the illustrated upper plates 7. The free ends 10 of the staples 9 are sharpened so that they can be driven through the opposite belt ends 15 and 16, and then are bent closed to the crimped condition shown in FIGS. 3–5, in which the upper and lower plates 7 are converged and securely mounted on the opposite belt ends 15 and 16.

The attachment of the disclosed fastener arrangement to the belt ends 15 and 16 may be accomplished by using the apparatus disclosed in related application Ser. No. 778,702 filed Oct. 18, 1991 entitled METHOD AND APPARATUS FOR FASTENING BELT ENDS, which is hereby incorporated by reference.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows.

1. A fastener for interconnecting opposite ends of a belt, comprising:

a plurality of upper plates having interior faces thereof shaped to abut an exterior side of the opposite belt ends, and arranged in a predetermined side-by-side relationship, with each of said upper plates including at least one fastener aperture extending through opposite ends thereof;

a plurality of lower plates having interior faces thereof shaped to abut an interior side of the opposite belt ends, and arranged in a predetermined side-by-side relationship, with each of said lower plates including at least one fastener aperture extending through opposite ends thereof, and positioned to align with the fastener apertures of an associated one of said upper plates;

a plurality of fasteners shaped to be closely received in the fastener apertures of said upper and lower plates, and including sharpened free ends adapted to be driven through the opposite belt ends, and bent closed to a crimped condition in which said upper and lower plates are converged and securely mounted on the opposite belt ends, and extend between a gap formed therebetween;

a sealing strip connected with one of said upper and lower plates, and retaining the same in said predetermined side-by-side relationship; said sealing strip being positioned to protrude inwardly from the interior faces of said one of said upper and lower plates, and being configured to bridge the gap between the opposite belt ends, whereby when the free ends of said fasteners are bent closed into the crimped position, said sealing strip is embedded into the associated one of the interior and exterior sides of both of the opposite belt ends and thereby forms a seal therebetween.

2. A fastener as set forth in claim 1, including:

a second sealing strip connected with the other one of said upper and lower plates, and retaining the same in said predetermined side-by-side relationship; said second sealing strip being positioned to protrude inwardly from the interior faces of the other one of said upper and lower plates, and being configured to bridge the gap between the opposite belt ends, whereby when the free ends of said fasteners are bent closed into the crimped position, said sealing strips are embedded into both the interior and exterior sides of both of the opposite belt ends to form a seal therebetween.

3. A fastener as set forth in claim 2, wherein:

said sealing strips comprise rigid bars extending generally perpendicular to longitudinally axes of said upper and lower plates.

4. A fastener as set forth in claim 3, wherein:

said sealing strips are positioned to extend along transverse axes of said upper and lower plates.

5. A fastener as set forth in claim 4, wherein:

said sealing strips have a generally circular transverse cross-sectional shape.

6. A fastener as set forth in claim 5, wherein:
said fastener free ends are press fitted into the apertures of one of said upper and lower plates prior to being driven through the opposite belt ends.

7. A fastener as set forth in claim 6, wherein:
said fasteners include staples.

8. A fastener as set forth in claim 7, wherein:
said upper and lower plates are rigid to define a hingeless slice.

9. A fastener as set forth in claim 4, wherein:
said sealing strips have a generally triangular transverse cross-sectional shape.

10. A fastener as set forth in claim 4, wherein:
said sealing strips have a generally rectangular transverse cross-sectional shape.

11. A fastener as set forth in claim 1, wherein:
said sealing strip comprises a rigid bar extending generally perpendicular to longitudinally axes of said upper and lower plates.

12. A fastener as set forth in claim 1, wherein:
said sealing strip is positioned to extend along transverse axes of said upper and lower plates.

13. A fastener as set forth in claim 1, wherein:
said sealing strip has a generally circular transverse cross-sectional shape.

14. A fastener as set forth in claim 1, wherein:
said fastener free ends are press fitted into the apertures of one of said upper and lower plates prior to being driven through the opposite belt ends.

15. A fastener as set forth in claim 1, wherein:
said fasteners include staples.

16. A fastener as set forth in claim 1, wherein:
said upper and lower plates are rigid to define a hingeless splice.

17. A fastener s set forth in claim 1, wherein:
said sealing strip has a generally triangular transverse cross-sectional shape.

18. A fastener as set forth in claim 1, wherein:
said sealing strip has a generally rectangular transverse cross-sectional shape.

19. A belt having opposite ends thereof interconnected by a fastener comprising:

a plurality of upper plates having interior faces thereof shaped to abut an exterior side of said opposite belt ends, and arranged in a predetermined side-by-side relationship, with each of said upper plates including at least one fastener aperture extending through opposite ends thereof;

a plurality of lower plates having interior faces thereof shaped to abut an interior side of said opposite belt ends, and arranged in a predetermined side-by-side relationship with each of said lower plates including at least one fastener aperture extending through opposite ends thereof, and positioned to align with the fastener apertures of an associated one of said upper plates;

a plurality of fasteners closely received in the fastener apertures of said upper and lower plates, and including sharpened free ends driven through said opposite belt ends, and bent closed to a crimped condition in which said upper and lower plates are converged and securely mounted on said opposite belt ends, and extend between a gap formed therebetween;

a sealing strip connected with one of said upper and lower plates, and retaining the same in said predetermined side-by-side relationship; said sealing strip being positioned to protrude inwardly from the interior faces of said one of said upper and lower plates, and being configured to bridge the gap between said opposite belt ends, whereby when the free ends of said fasteners are bent closed into the crimped position, said sealing strip is embedded into the associated one of the interior and exterior sides of both of said opposite belt ends and thereby forms a seal therebetween.

20. A belt as set forth in claim 19, including:
a second sealing strip connected with the other one of said upper and lower plates, and retaining the same in said predetermined side-by-side relationship; said second sealing strip being positioned to protrude inwardly from the interior faces of the other one of said upper and lower plates, and being configured to bridge the gap between said opposite belt ends, whereby when the free ends of said fasteners are bent closed into the crimped position, said sealing strips are embedded into both the interior and exterior sides of both of said opposite belt ends to form a seal therebetween.

21. A fastener as set forth in claim 19, wherein:
said sealing strips comprise rigid bars extending generally perpendicular to longitudinally axes of said upper and lower plates.

* * * * *